United States Patent
Ohanesian

Patent Number: 5,778,598
Date of Patent: Jul. 14, 1998

[54] SHUTTER DOOR ASSEMBLY

[75] Inventor: Harout Ohanesian, Northridge, Calif.

[73] Assignee: U.S. Polymers, Inc., Commerce, Calif.

[21] Appl. No.: 257,084

[22] Filed: Jun. 9, 1994

Related U.S. Application Data

[63] Continuation-in-part of Ser. No. 966,936, Oct. 27, 1992, Pat. No. 5,342,187.

[51] Int. Cl.$^6$ ................................................. E06B 7/08
[52] U.S. Cl. .......................... 49/74.1; 49/403; 49/87.1; 52/656.9
[58] Field of Search ........................ 49/63, 64, 67, 49/74.1, 87.1, 403, 501; 52/656.9

[56] References Cited

U.S. PATENT DOCUMENTS

| | | | |
|---|---|---|---|
| 702,148 | 6/1902 | Nettleton | 49/403 |
| 2,423,260 | 7/1947 | Slaughter | |
| 3,191,241 | 6/1965 | Johnson | 49/403 |
| 3,296,661 | 1/1967 | Moustier | |
| 3,550,269 | 12/1970 | Yatabe et al. | |
| 3,700,763 | 10/1972 | van Kralingen | |
| 3,750,336 | 8/1973 | Johnson | 49/403 X |
| 3,898,728 | 8/1975 | Rousseau | 52/656.9 X |
| 4,187,641 | 2/1980 | Thompson | 49/403 |
| 4,401,424 | 8/1983 | De Zen | |
| 4,913,863 | 4/1990 | Burrafato et al. | |
| 4,967,511 | 11/1990 | Werginz et al. | 49/74.1 X |
| 4,996,793 | 3/1991 | Mazur | 49/74.1 |
| 5,010,708 | 4/1991 | Evans et al. | 52/656.9 |
| 5,028,376 | 7/1991 | Vanderwoude | |
| 5,187,896 | 2/1993 | Ross | 49/74.1 |
| 5,191,735 | 3/1993 | Ross | 49/74.1 |
| 5,303,863 | 4/1994 | Oille | 49/74.1 |
| 5,342,187 | 8/1994 | Ohanesian | 49/74.1 X |
| 5,379,551 | 1/1995 | Swapp | 49/74.1 X |

FOREIGN PATENT DOCUMENTS

| | | | |
|---|---|---|---|
| 220355 | 5/1987 | European Pat. Off. | 49/403 |
| 2303933 | 10/1976 | France | 49/67 |
| 2476734 | 8/1981 | France | 49/403 |

Primary Examiner—Jerry Redman
Attorney, Agent, or Firm—Joseph C. Andras

[57] ABSTRACT

A shutter door assembly assembled primarily from extruded plastic components is provided. The shutter door assembly includes an outer rectangular frame surrounding a pivotally attached vaned panel door. Various side, top, and bottom legs of the frame and door are constructed of a hollow extruded plastic and are securely mounted together to form a rigid, durable shutter door. The resulting shutter door has the general look and feel of an actual wooden door.

14 Claims, 7 Drawing Sheets

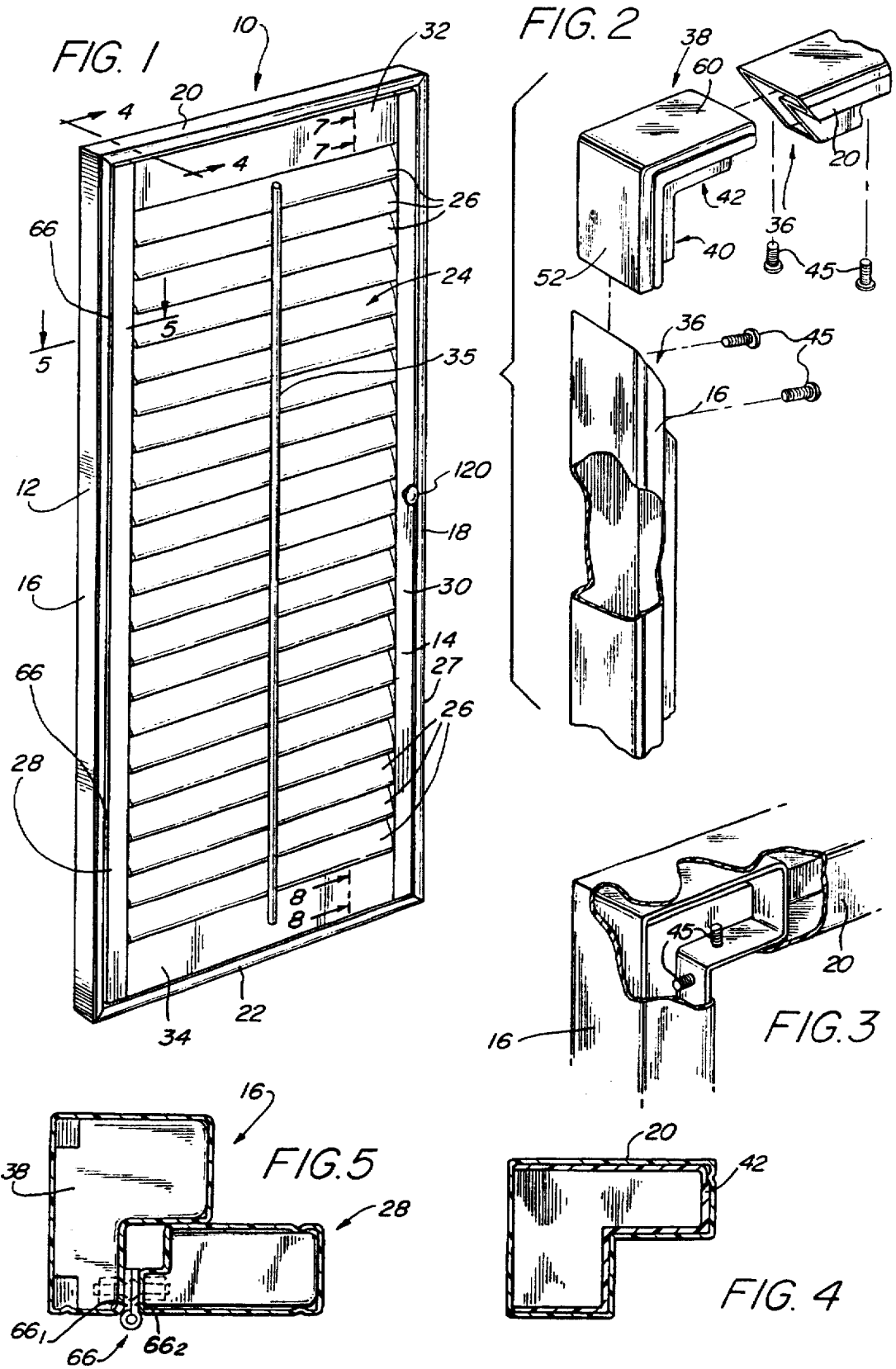

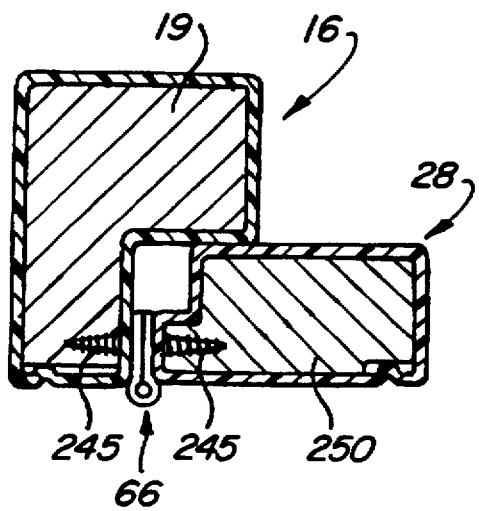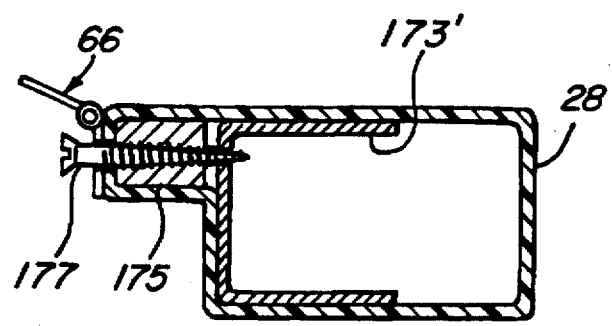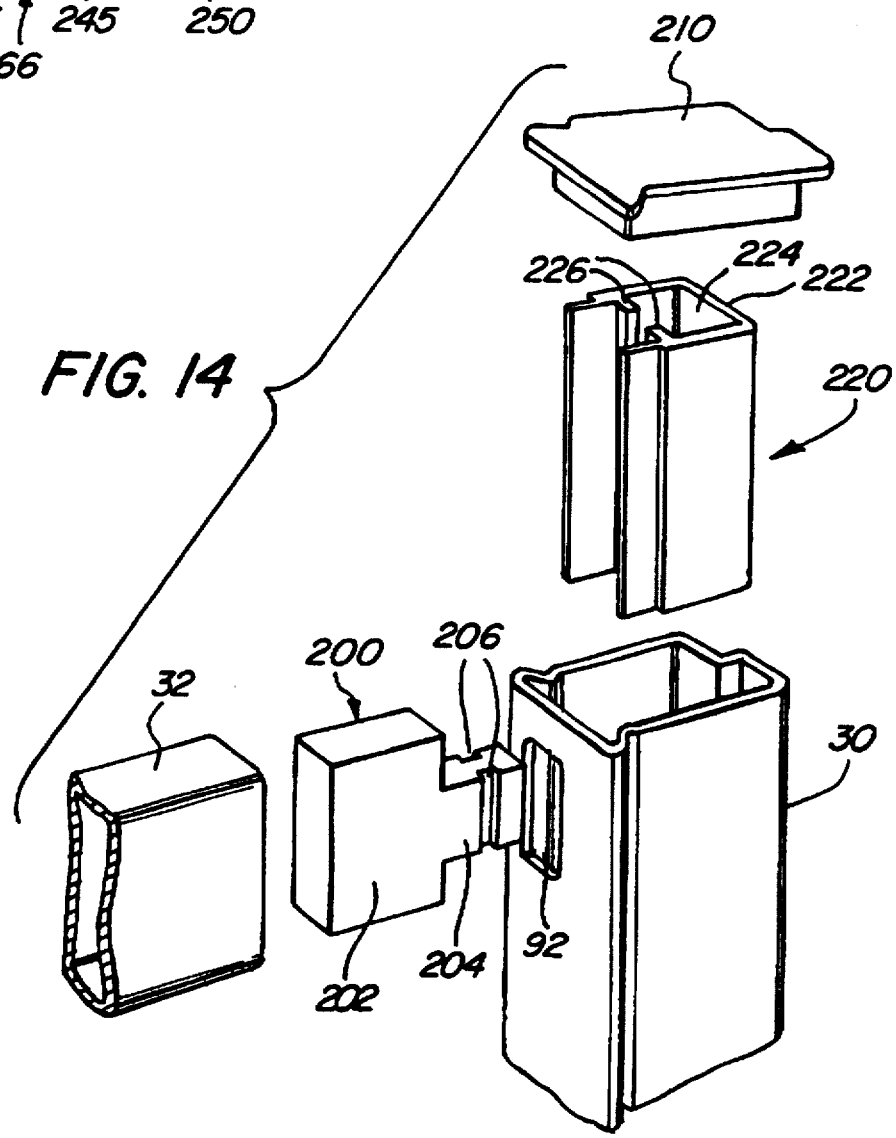

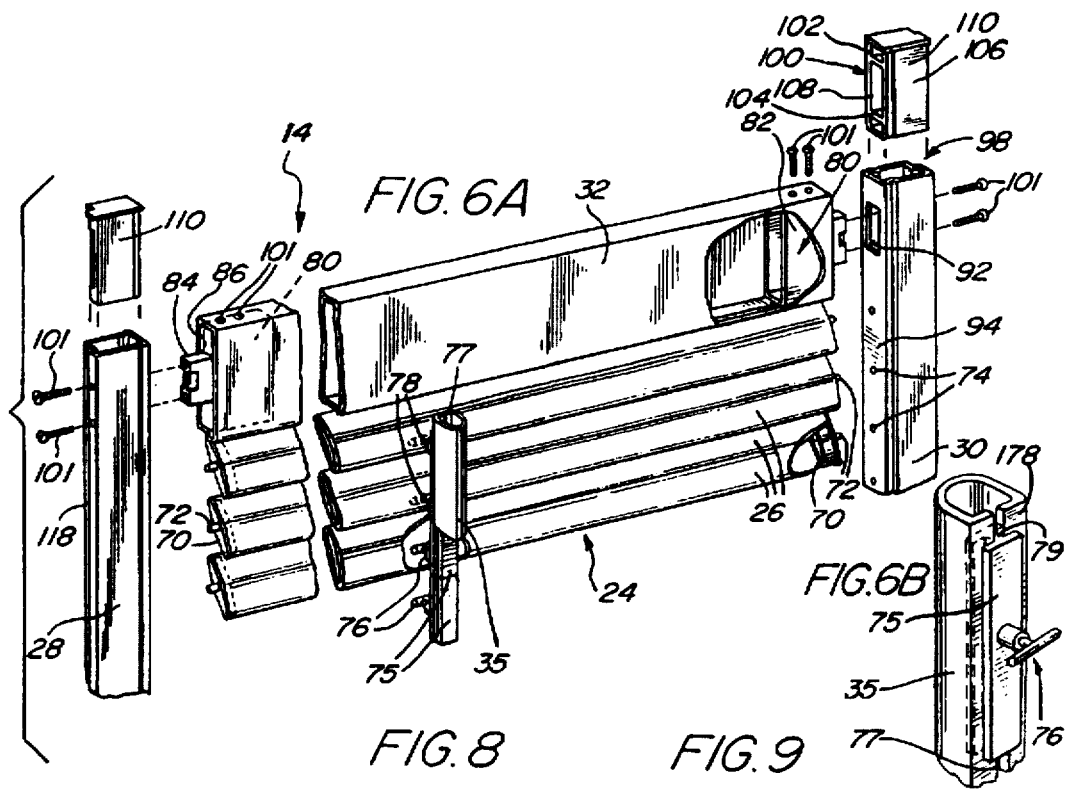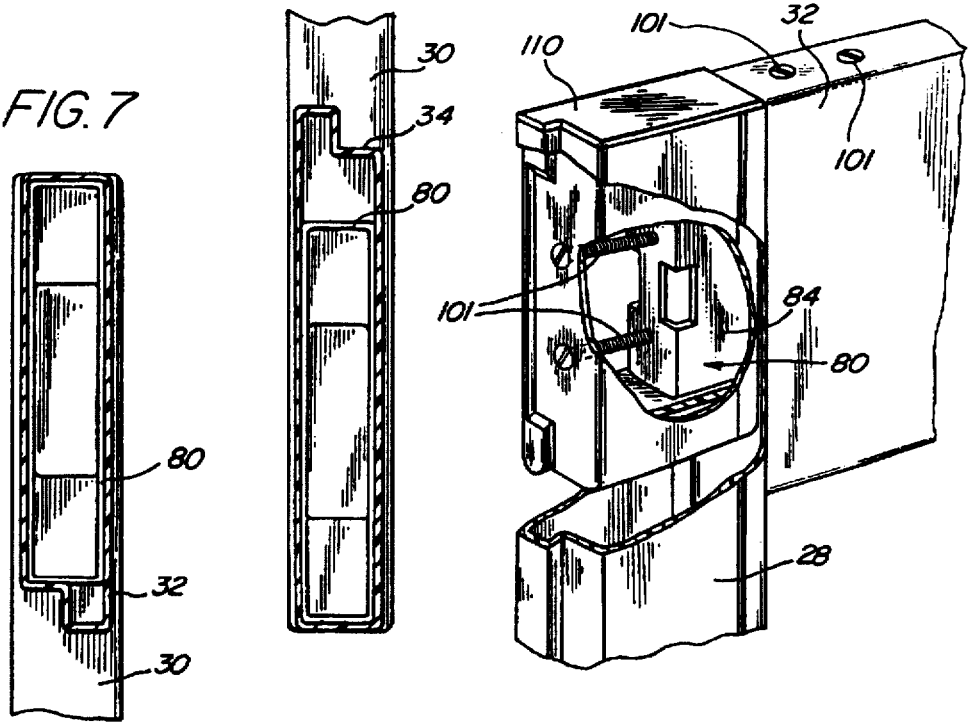

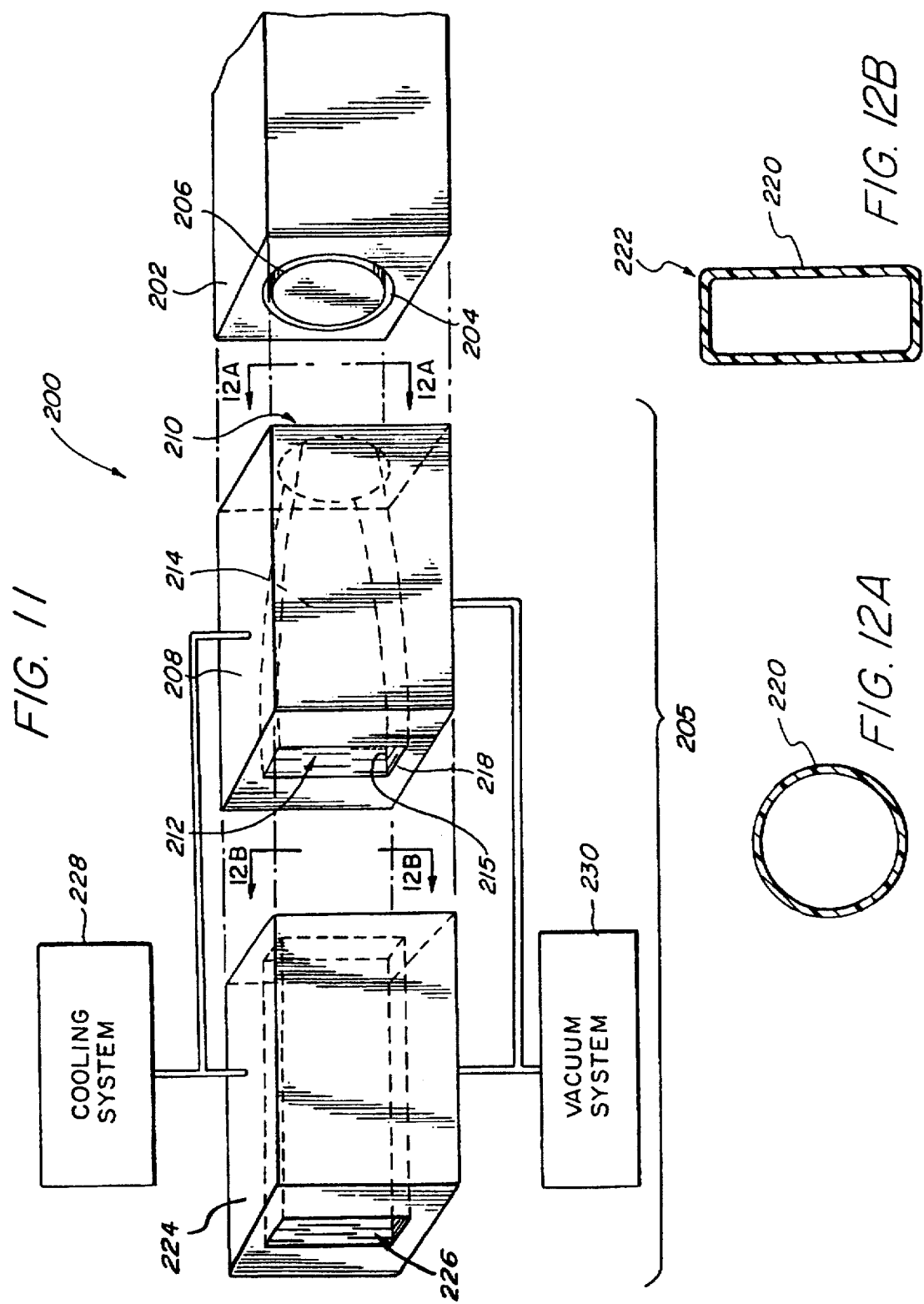

SHUTTER DOOR ASSEMBLY

CROSS-REFERENCE TO RELATED APPLICATION

This application is a continuation-in-part of application Ser. No. 07/966,936 filed Oct. 27, 1992 for SHUTTER DOOR, now U.S. Pat. No. 5,342,187.

BACKGROUND OF THE INVENTION

1. Field of the Invention

The invention relates generally to shutter door assemblies and to fabrication methods therefore.

2. Description of Related Art

A wide variety of shutter door designs of the jalousie type have been developed over the years. These typical shutter doors are provided with a set of vanes pivotally mounted within a rectangular frame to regulate the amount of air or light passing through. Such shutter doors are typically constructed entirely of wood.

Some people have tried to make shutter doors from a plastic material or the like, rather than wood, to provide a lighter and less expensive shutter door. Further, a shutter door constructed of lightweight plastic components may be assembled more easily than a shutter door constructed entirely of wood. Thus, while a wooden shutter door must typically be manufactured at a factory after receipt of an order from a customer, a shutter door constructed of plastic components can be assembled by a jobber, a retailer, or a customer. Accordingly, the customer may not have to endure a long wait for a factory-assembled shutter door. Further, by allowing the shutter door components to be shipped in disassembled form to a jobber, a retailer, or a customer, rather than in assembled form, shipping costs and storage costs are greatly reduced.

Unfortunately, a suitable plastic shutter door assembly has not yet been devised. Conventional plastic shutter door assemblies are often too complicated for easy assembly by a retailer or customer. Special tools or skills may be required to assemble the shutter door. Once assembled, the shutter doors are often flimsy and unable to resist common wear and tear, especially where the shutter door is mounted to an exterior of a building and thereby subject to wind, storms, and the like.

Regarding plastic extrusion techniques in general, a wide variety of such techniques have been developed for forming plastic tubes of a variety of shapes and sizes. Typically, such devices employ an extrusion head for extruding a tube of extrudant and a calibrator for cooling the extrudant while maintaining its shape. To form a tube having a circular cross-section, an extrusion head having a circular cross-section is employed in conjunction with a calibrator having a central circular cooling conduit. The circular tube of extrudant is fed into the conduit of the calibrator, where it is cooled. A vacuum system is employed to maintain the tube of extrudant against the inside of the conduit of the calibrator, to thereby maintain the shape of the tube as the tube is cooled. To form a generally rectangular cross-sectional tube, a rectangular extrusion head is employed along with a calibrator having a rectangular cooling conduit. In general, both the shape of the cooling conduit of the calibrator and the shape of the extrusion head must match the cross-sectional shape or profile of the desired tube shape. That is, to form a circular tube, a circular extrusion head and a circular calibrator must be employed. To form a rectangular tube, a rectangular extrusion head and a rectangular calibrator conduit must be employed. Whereas a calibrator may be fairly easily provided with a central conduit having a desired shape, it is often expensive to provide for an extrusion head having an arbitrary desired profile.

A wide variety of sizes and shapes of tubes are needed to make a shutter door assembly. Accordingly, a wide variety of extrusion heads and corresponding calibrator conduits must be employed.

Finally, with regard to conventional extrusion techniques, tubes with rectilinear cross-sections formed from conventional extrusion techniques typically have sharp corners. These sharp corners tend to weaken the tube.

OBJECTS AND SUMMARY OF THE INVENTION

From the foregoing, it can be appreciated that there is a need to provide an improved shutter door assembly.

It is an object of the invention to provide an improved shutter door assembly which may be shipped in disassembled form for later assembly by a jobber, retailer, or customer;

It is a further object of the invention to provide a shutter door assembly of a durable construction to withstand wear, tear, and weathering;

It is a further object of the invention to provide a device for forming a tube of arbitrary shape; and It is a further object of the invention to provide extruded tubes of generally rectilinear cross-section without sharp, weak corners.

These and other objects of the invention are achieved by a shutter door assembly having an outer frame and a louver door, both of which may be filled with reinforcing wood inserts.

The outer frame is comprised of four hollow frame members formed of extruded plastic connected internally by four corner blocks. Each corner block includes a pair of extending arms. When both arms of a corner block are completely inserted into adjacent hollow frame members, the entire corner block is enclosed and hidden from view. Each corner of the outer frame includes a securing means for securing the corner block arms inside the hollow frame member, thereby securing the hollow frame members to one another. Securing the frame members to one another with corner blocks ensures a sturdy, durable outer frame.

The louver door is comprised of an inner frame and a plurality of parallel hollow plastic vanes pivotally mounted to the inner frame. The inner frame of the louver door is hinged inside of the outer frame. The louver door preferably includes a tilt rod connected to a set of the hollow vanes. The hollow vanes enable an inexpensive and reliable connecting means comprising a plurality of T-hooks on a back side of the tilt rod and a corresponding plurality of slots formed along a front side of the hollow vanes.

The shutter door assembly of the present invention is beneficially constructed using extruded high-impact polymer profiles and injection-molded parts for durability and other benefits such as resistance to warping, fading, cracking, peeling, etc. which are not available when other materials such as wood are used. The entire assembly is thereby sufficiently lightweight for inexpensive shipping and storage. Further, the shutter door assembly may be quickly and easily assembled by a jobber, a retailer, or a customer using only a few common tools, and may be shipped and stored in a compact disassembled form. Shipping and storage costs are thereby minimized and customer orders are filled more promptly. Furthermore, a set of individual components having a range of sizes can be shipped to a retailer such that a number of shutter doors of various sizes and shapes are easily assembled by selecting suitable components. Thus, a number of "custom" orders may be quickly filled without further fabrication.

The assembled shutter door is sturdy and durable and has the general appearance of painted wood. The extruded plastic components may be formed in a variety of colors.

In accordance with an alternative aspect of the invention, a device for forming an extruded tube having a desired cross-sectional shape is provided. The device transforms a tube of extrudant having an initial, typically circular, cross-section into a tube having a different, typically noncircular, cross-section, such as a rectangle, square, or L-shaped tube. The device includes a means for extruding a tube of extrudant. The device further includes an after-forming conversion conduit for receiving the tube of extrudant and for converting the tube from the initial cross-sectional shape to the desired cross-sectional shape. To this end, the conversion conduit has an entry aperture shaped and sized to receive the initial tube of extrudant, and an exit aperture having the desired cross-sectional shape. The entry aperture and the exit aperture each have peripheries of substantially the same circumference. Further, the entry aperture and the exit aperture are connected by a generally conical conduit, which connects the periphery of the entry aperture to the periphery of the exit aperture. Means are provided for maintaining the extrudant against inner walls of the connecting conduit such that, as the tube of extrudant passes through the conduit from the entrance aperture to the exit aperture, the cross-sectional shape of the extrudant is gradually transformed from the initial cross-sectional shape to the desired cross-sectional shape.

Preferably, the initial cross-sectional shape provided by the extrusion means is substantially circular. The desired cross-sectional shape is rectangular, square, L-shaped, or any other arbitrary desired noncircular shape. The means for maintaining the extrudant against the inner walls of the connecting conduit is a vacuum system such as conventionally found in vacuum calibrators. The device is further provided with a calibrator for additionally cooling the extrudant. The calibrator includes an internal conduit having the desired cross-sectional shape for receiving the extrudant from the exit aperture of the conversion conduit and a means for cooling the extrudant as it passes through the calibrator. Preferably, the conversion conduit and calibrator are a single integral unit. The cooling system comprises a manifold of tubes surrounding the internal conduit of the combined calibrator and after-former for passing a cooling liquid within the calibrator and after-former. Also preferably, if the desired shape of the extrudant is generally rectilinear, rounded corner portions are provided on the extrudant to minimize weakness caused by sharp corner portions.

Thus, in accordance with one aspect of the invention, a device is provided for receiving a circular tube from an extrusion head and for converting the circular tube into a desired noncircular shape such as a rectangle. Unlike prior art extrusion systems, a special extrusion head need not be provided for each different desired shape. Rather, a single circular extrusion head is employed regardless of the non-circular profile of the desired final tube. Only the combined calibrator and after-former conversion conduit need to be matched to the desired shape, and a single circular extrusion head can always be used. However, if desired, a noncircular extrusion head may be used. In such an embodiment, the entry aperture of the after-former conversion conduit is shaped to match the noncircular shape of the extrusion head.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a perspective view of a shutter assembly constructed in accordance with the present invention;

FIG. 2 is an exploded perspective view of a corner portion of an outer frame used in the shutter door assembly of FIG. 1;

FIG. 3 is a partially cutaway perspective view of the outer frame of FIG. 2, shown in assembled form;

FIG. 4 is a cross-sectional view of a top hollow member of the outer frame used in the shutter door assembly of FIG. 1, taken along line 4—4;

FIG. 5 is a cross-sectional view of a side portion of the shutter door assembly of FIG. 1, taken along line 5—5, showing a side hollow member of the outer frame hinged to an inner frame, and showing a first alternative hinge mounting structure;

FIG. 5A is a cross-sectional view, comparable to FIG. 5, but showing a preferred reinforcing and hinge mounting structure involving elongated wood inserts and wood screws;

FIG. 6A is an exploded view of a top portion of the louver door of the shutter door assembly of FIG. 1;

FIG. 6B is a partial perspective view of a tilt rod used in the louver door of FIG. 6A;

FIG. 7 is a cross-sectional view of a top rail portion of the louver door in the shutter door assembly of FIG. 1, taken along line 7—7;

FIG. 8 is a cross-sectional view of a bottom rail portion of the louver door in the shutter door assembly of FIG. 1, taken along line 8—8;

FIG. 9 is a partially cutaway perspective view of one connecting structure embodiment for the louver door's inner frame;

FIG. 10C is a cross-sectional view showing a fourth alternative reinforcing and hinge mounting structure;

FIG. 11 is a perspective exploded view of an extrusion system, in accordance with the invention, for forming tubes of extrudant of noncircular cross-section;

FIG. 12A is a cross-section of a tube of extrudant as would be found along line 12A—12A of FIG. 11;

FIG. 12B is a cross-section of a tube of extrudant as would be found along line 12B-12B of FIG. 11;

FIG. 14 is an exploded perspective view of another connecting structure embodiment for the louver door's inner frame;

DETAILED DESCRIPTION OF THE PREFERRED EMBODIMENTS

Figure 10A:
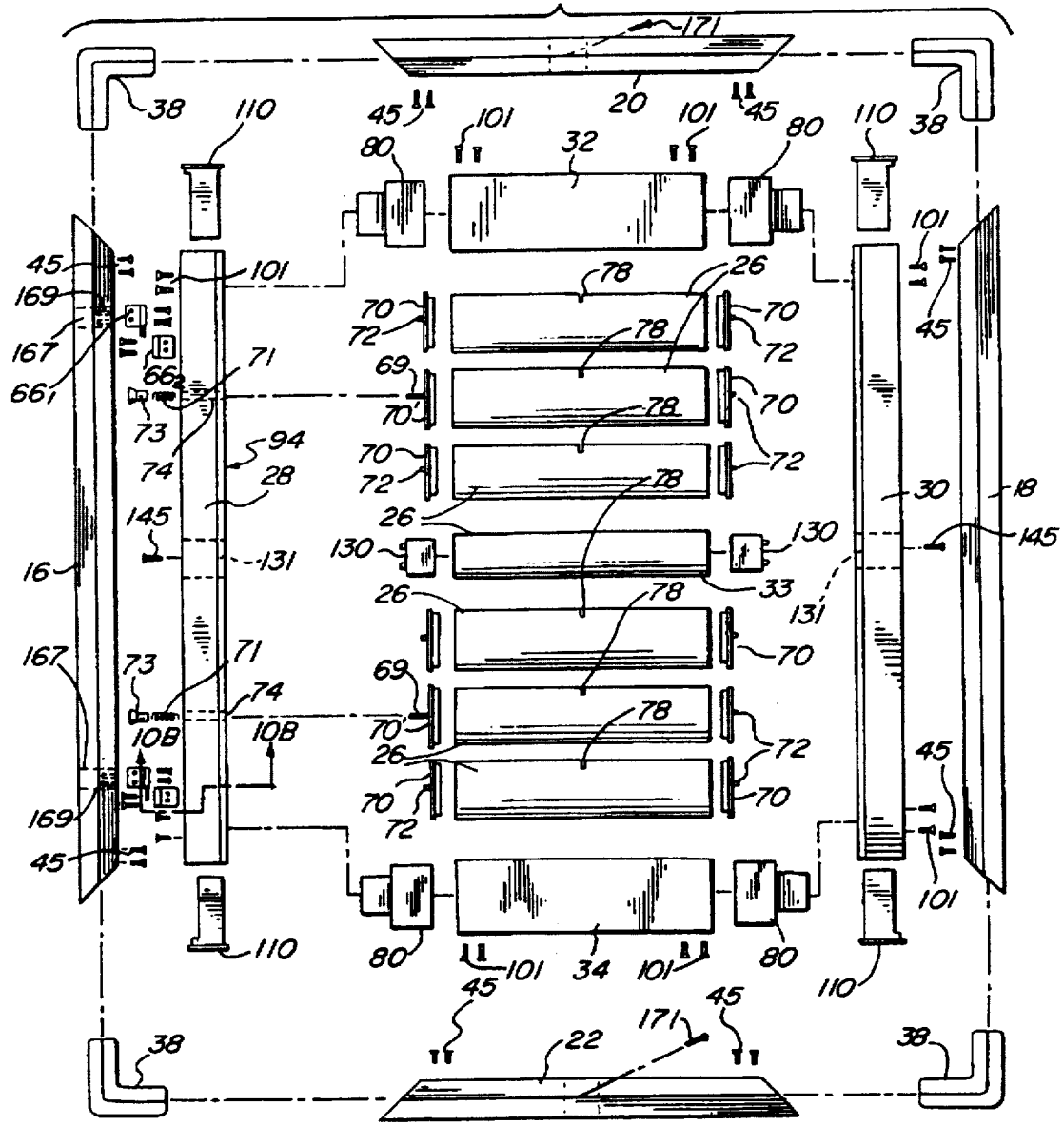
FIG. 10A is an exploded view of an alternative embodiment of a shutter door assembly according to the present invention, including a second alternative hinge mounting structure.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a shutter door assembly constructed primarily of hollow extruded plastic components.

FIG. 1 depicts a fully-assembled shutter door assembly 10 constructed in accordance with the present invention. The shutter door assembly 10 includes a generally rectangular outer frame 12 and a generally rectangular louver door 14. The outer frame 12 is generally secured in a window frame (not shown) with screws 171 as suggested in FIG. 10A.

Although the figures show only a single louver door 14, the shutter door assembly 10 may have two or more louver doors, either in a side-by-side arrangement with each louver door mounted directly to opposite sides of the outer frame 12, or with a pair of louver doors mounted in an articulated arrangement wherein one louver door 14(1) mounts directly to the outer frame 12, and the other louver door 14(2) mounts to an outer free edge of the first louver door 14(1). For simplicity, however, the drawings only show one louver door 14.

The outer frame 12 includes left and right hollow frame members 16, 18, top and bottom hollow frame members 20, 22, and four corner blocks 38.

The hollow frame members 16, 18, 20, 22 are provided with angled end portions 36 so that they abut to form a smooth right angle joint. When so arranged, the frame members are internally secured to one another with the corner blocks 38.

The corner blocks 38 include first and second extending arms 40, 42 for insertion into two adjacent hollow frame members 16, 20. The corner blocks 38 are preferably hollow and constructed of injection-molded plastic.

FIG. 2 is an exemplary view of the interconnection between a corner block 38, the left frame member 16, and the top frame member 20. As shown, the corner block's extending arms 40, 42 fit into the hollow frame members 16, 20. Accordingly, the corner block's extending arms have a similar, but slightly smaller cross-sectional shape (here, L-shaped) than the hollow frame members 16, 20. When fully assembled, as shown in FIG. 3, the corner block 38 is completely enclosed and not visible from the exterior.

As further shown in FIG. 2, screws 45, 45 may be used to secure the hollow frame members to the corner blocks 38. In such event, holes are preferably drilled in the frame members to facilitate insertion of the screws 45. For example, in FIG. 2, two pairs of screws 45, 45 pass through holes in the hollow frame members 16, 20 into the extending arms 40, 42 of the corner block 38. The corner blocks 38 may also be secured by other methods, such as adhesives.

As suggested in cross-section by FIG. 5A, the hollow frame members 16, 18, 20, 22 may be reinforced with elongated frame inserts 19 located between the corner blocks 38. The inserts 19 provide rigidity which is especially helpful for a larger outer frame 12. The inserts 19 may be formed from pressed wood pulp to reduce cost.

The louver door 14, as shown in FIGS. 6A–9, includes an inner frame 27 and a vane assembly 24. As shown in FIG. 1, a knob 120 may be mounted to the louver door 14.

Figure 13:
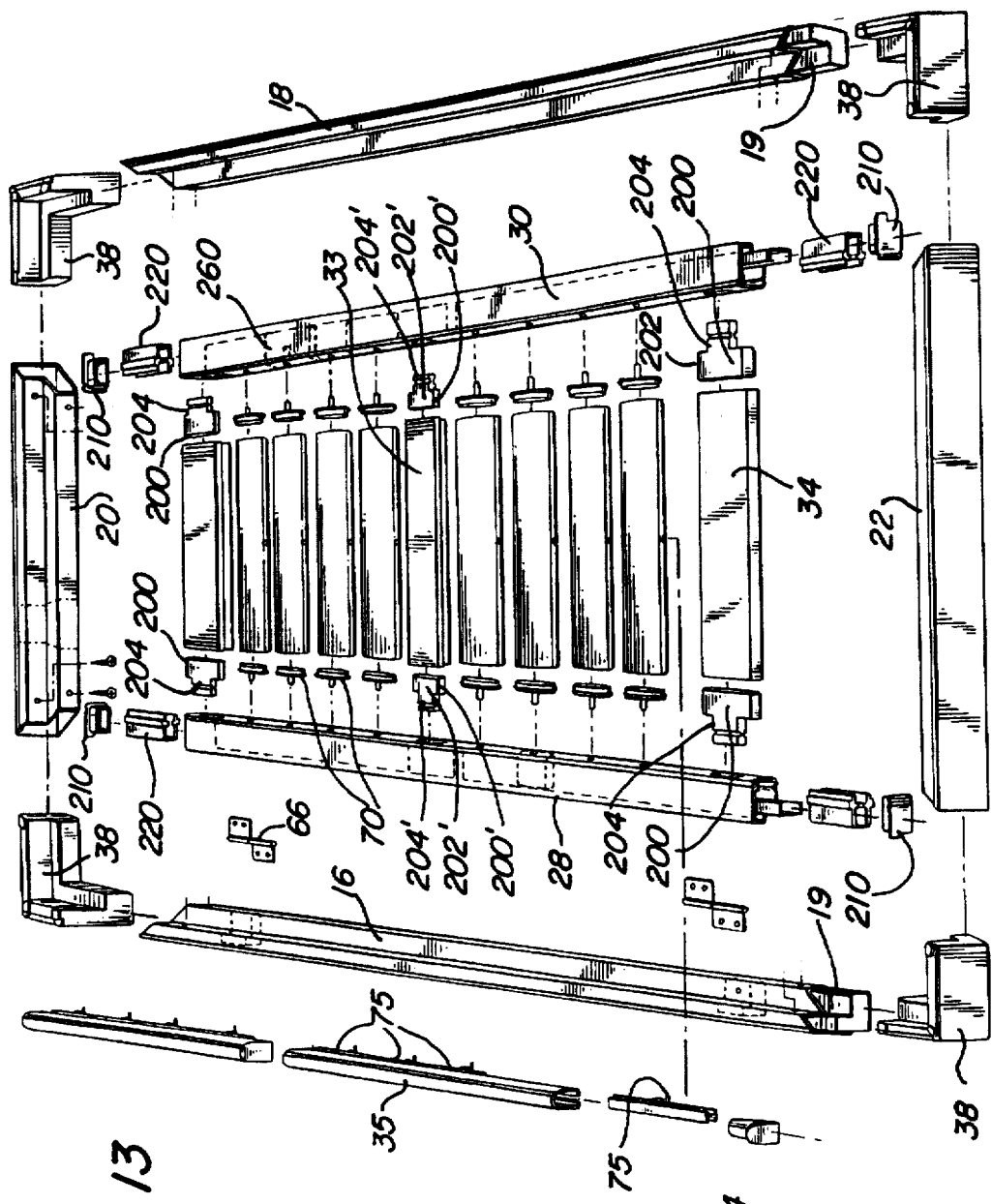
FIG. 13 is an exploded view of an alternative embodiment of a shutter door assembly according to the present invention.

The inner frame 27 is generally comprised of four hollow members: left and right vertical stiles 28, 30 and top and bottom horizontal rails 32, 34. As shown in FIGS. 10A and 13, the inner frame 27 may also include a middle rail 33. The rails and stiles of the inner frame 27 may be interconnected in a variety of ways.

FIGS. 13 and 14 illustrate a first preferred assembly structure where the rails 32, 34 are connected to the stiles 28, 30 with a plurality of rail joints 200 and interlocking lock blocks 220, without screw fasteners. Decorative stile caps 210 are used to hide the interconnections. FIG. 14 shows an exemplary interconnection of the top rail 32 with the right stile 30 and more clearly illustrates the construction of the rail joint 200 and the lock block 220.

As shown, the rail joint 200 includes a rectangular body 202 and a protruding tongue 204 with opposed notches 206. The body 202 of the rail joint 200 is sized to fit closely inside the hollow rails 32, 34. The tongue 204 of the rail joint 200 is sized to fit into an aperture 92 located in the stile 30.

The lock block 220 includes a generally U-shaped body 222 and a pair of opposed, inwardly-facing ribs 226 that define a cavity 224. The body 222 of the lock block 220 is sized to fit closely within the stiles 28, 30.

Assembly is accomplished by cementing the body 202 of the rail joint 200 into the top rail 32; inserting the tongue 204 of the rail joint 200 into the aperture 92 in the right stile 30; and sliding the lock block 220 into the right stile 30 so that its ribs 226 securely engage the slots 206 of the rail joint's tongue 204. The assembly is finished off by cementing the stile cap 210 onto the stile 30.

If a middle rail 33 is used as shown in FIG. 13, then an additional pair of middle rail joints 200' are used. The middle rail joints 200' have a body 202' that is sized, as needed, to fit into the middle rail 33. The middle rail joint 200' also has a notched tongue 204' that fits into an aperture 92 located in one of the stiles 28, 30. A lock block 220 is slid into the stile 28, 30 until its ribs 226 engage the notches of the middle rail joint 204'.

FIGS. 6A, 7, 8, 9, and 10A illustrate a second alternative assembly structure where the rails 32, 34 are connected to the stiles 28, 30 with a plurality of rail joints 80, stile caps 110, and screws 101. FIG. 9 shows an exemplary interconnection between the top rail 32 and the left stile 28.

As shown, the rail joint 80 includes a hollow rectangular body 82 and a smaller rectangular tongue 84, protruding therefrom. As shown in FIGS. 7 and 8, the body 82 of the rail joint 80 is sized to fit within the top rail 32. The tongue 84 of the rail joint 80 is sized to fit within the aperture 92 of the stile 28.

The stile cap 110 includes a rectangular body that carries a rectangular cavity 100 bounded by upper and lower walls 102, 104 and side walls 106, 108. The stile cap 110 is sized to closely fit inside the stiles 28, 30. The cavity 100 of the stile cap 110 is sized to receive the tongue 84 of the rail joint 80.

Assembly is accomplished by securing the rail joint 80 to the rail 32 with screws 101; inserting the stile cap 110 into the stile 28 so that the stile cap cavity 100 is aligned with the stile aperture 92; inserting the rail joint tongue 84 through the stile aperture 92 and into the stile cap cavity 100; and securing the rail joint tongue 84 with screws 101. Attachment mechanisms, such as glue or other adhesives, may be used instead of the screws 101.

FIG. 10A is an exploded view of a shutter door assembly 10 that uses the second alternative assembly structure, just described, and includes a hollow middle rail 33. Here, the middle rail 33 is mounted to the centers of the left and right stiles 28, 30 with center section fixing blocks 130. The fixing blocks 130 are mounted in the hollow ends of the middle rail 33 and protrude into corresponding apertures in the vertical stiles 28, 30, where they are secured by stile blocks 131 mounted within the hollow interiors of the stiles. Screws 145 are provided for securing the blocks 130 in the stile apertures. Alternatively, adhesive could also be used to secure the blocks 130.

Figure 15:
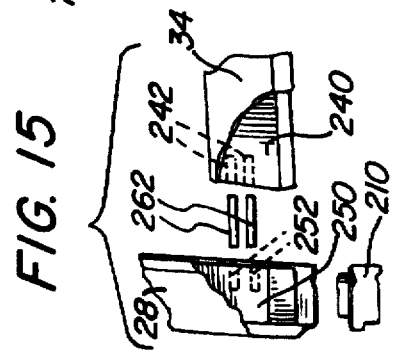
FIG. 15 is an exploded perspective view of another connecting structure embodiment for the louver door's inner frame.

FIG. 15 illustrates a third alternative assembly structure wherein the rails 32, 34 are connected to the stiles 28, 30 with wood inserts 240, 250 and dowels 262. As with the first preferred assembly structure, the decorated stile caps 210 are used to hide the interconnections.

As shown in FIG. 15, a stile insert 250 having a plurality of apertures 252 is inserted in the left stile 28 and a rail insert 240 having a plurality of apertures 242 is inserted in the bottom rail 34. Assembly is accomplished by sandwiching the dowels 262 between the inserts 240, 250, into opposing pairs of apertures 242, 252. A suitable adhesive may be desired to provide a solid connection.

The vane assembly 24, as best shown in FIG. 6A, is generally comprised of a plurality of vanes 26, a plurality of vane caps 70, a tilt rod 35, and a plurality of T-hook members 75.

Each vane 26 is preferably constructed of extruded hollow plastic. A pair of the vane caps 70, 70 are internally secured to the opposite side of each hollow vane 26. The vane caps 70 may be secured through a press fit, glue, solvent, a sonic weld, or other suitable means. Each vane cap has a pivot pin 72. The pivot pins 72 are pivotally received in apertures 74 located on the vertical stiles 28, 30 so that the vanes 26 may pivot therebetween. The stile insert 250, if used, also has apertures that align with the apertures 74 of the vertical stiles 28, 30.

The tilt rod 35 connects to a plurality of the vanes 26 to adjust the amount of light or air passing through the shutter door assembly 10. The tilt rod 35 is also constructed of hollow extruded plastic and, as best shown in FIG. 6B, has a flat rear surface 178 with a longitudinal slot 77. A plurality of tilt rod caps (shown in FIG. 13) are provided for cosmetically plugging the ends of the hollow tilt rod 35. As shown in FIG. 13, the tilt rod 35 may be internally reinforced with an insert T1.

The T-hook members 75 connect the tilt rod 35 to a plurality of the vanes 26. There should be as many T-hook members 75 as there are vanes 26. As best shown in FIG. 6B, each T-hook member 75 includes a rectangular I-bar plate 79 and a single T-hook 76. The I-bar plate 79 is sized for slidable insertion into the tilt rod slot 77 with the T-hook 76 extending rearwardly from the tilt rod 35. The I-bar plates 79 are of uniform length such that, when abutting one another in the tilt rod 35, their respective T-hooks 76 are spaced by an amount corresponding to the spacing between the vanes 26.

A vertical slot 78 is centrally formed at a front edge of each hollow vane 26. In addition to serving as a connecting means (explained below), the slots 78 allow hot air to escape from the interior of the hollow vanes, keeping the preferred PVC material below its deflection temperature.

The slots 78 are shown most clearly in FIG. 10A. Each T-hook 76 is received within a corresponding slot 78 to secure the tilt rod 35 to the vanes 26. As can be seen from FIG. GB, the T-hook 76 is preferably symmetric, i.e., the T-hook 76 extends the same distance on both sides of the T-hook member 75. When assembled, the vane slots 78 are substantially vertical, whereas the T-hooks 76 are substantially horizontal. The perpendicular alignment keeps the T-hooks 76 securely within the vane slots 78.

Assembly of the vane assembly 24 is accomplished by inserting the T-hooks 76 into the vane slots 78 and then sliding the tilt rod 35 onto the I-bar plates 79 of the several T-hook members 75.

A means for providing rotational friction or tension is preferably employed with at least 1 out of every 12 of the pivoting vanes 26 to prevent the vanes from rotating under the weight of the tilt rod 35 and to help provide the same feel that is associated with wood shutters.

Figure 17:
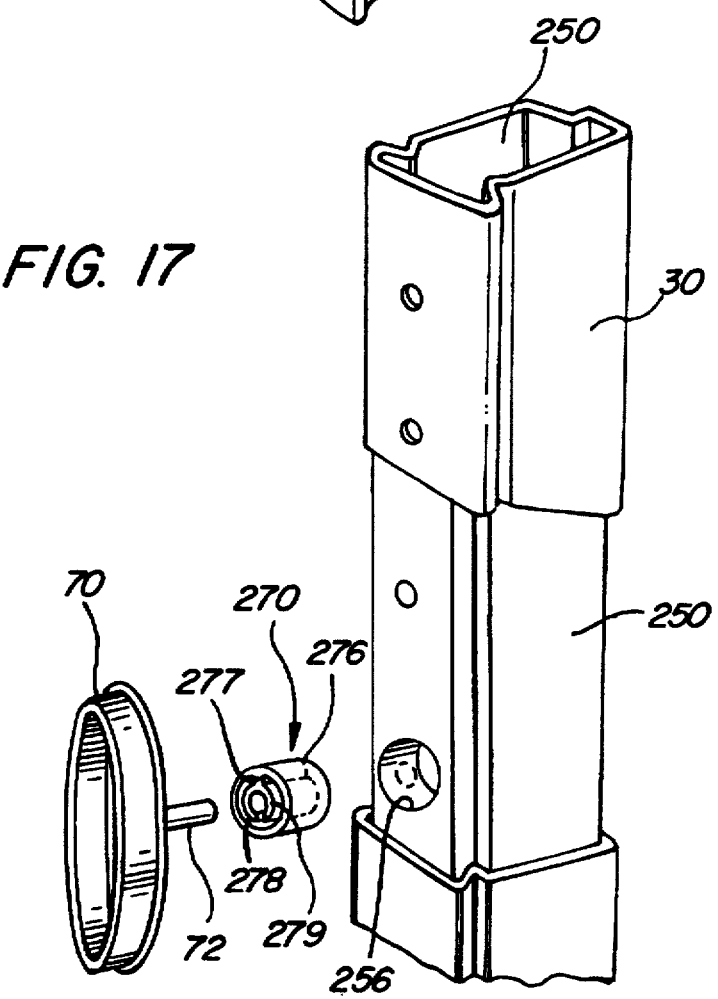
FIG. 17 is a partial cutaway and exploded perspective view of a preferred means for tensioning.

FIG. 17 shows a preferred tensioning means that is employed with the wood insert 250 shown in FIG. 15. Here, the tensioning means is comprised of a tensioning insert 270 that has a cylindrical body 276 and an axial rib 277 that internally supports two arcuate members 278, 279. The body 276 of the tensioning insert 270 is sized for a tight press fit into an enlarged aperture 256 drilled into the wood insert 250. The arcuate members 278, 279 are spaced to tightly receive the pivot pin 72. The tensioning insert 270 is preferably comprised of an injection-molded polymer, preferably acetal, but may be formed by any method and of any material which provides a resilient fit between the arcuate members 278, 279 and the pivot pin 72.

Figure 16:
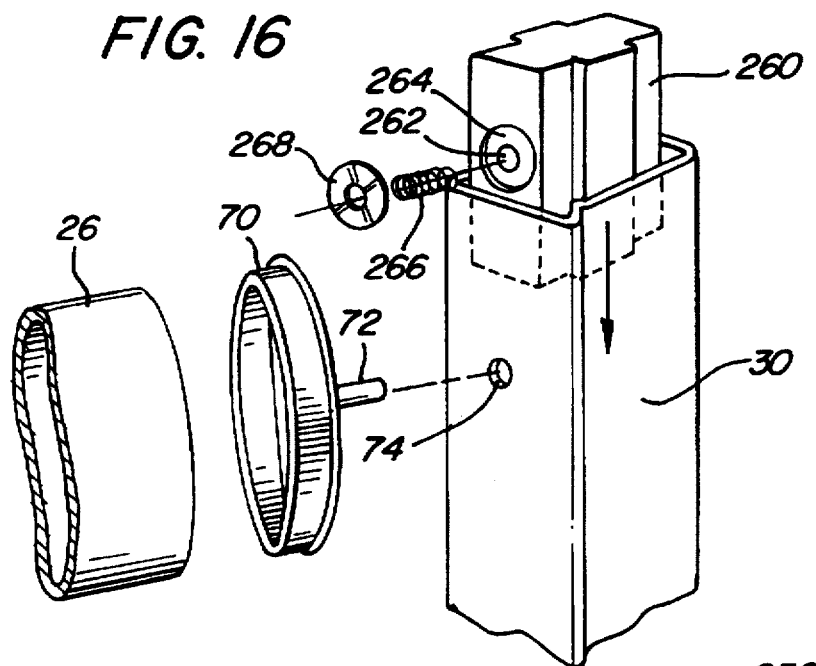
FIG. 16 is an exploded perspective view of a first alternative means for tensioning the louver door's vanes to simulate the feel of a wood shutter door.

FIG. 16 shows a first alternative tensioning means that is comprised of an insert block 260, a tensioning spring 266, and a push-on nut 268. The insert block 260, preferably made of wood, has an aperture 262 sized to receive the tensioning spring 266 and a counter-bore 264 sized to receive the push-on nut 268.

The first alternative tensioning means is installed by sliding the insert block 260, the spring 266, and the push-on nut 268, as a unit, into the stile 30 until it aligns with a desired aperture 74. The pivot pin 72 of a vane cap 70 is then inserted through the aperture 74 and the push-on nut 268 into the insert aperture 262, where it compresses the tensioning spring 266. The push-on nut 268, providing a one way connection, helps to prevent any spread between the stiles 28, 30.

Where the stiles 28, 30 are fully cored with a wood insert 250, as in FIG. 15, then the aperture 262 and counterbore 264 are formed directly on the insert 250.

FIG. 10A shows a second alternative tensioning means that works with a female nut 73, a spring 71, and a special vane cap 70' having a threaded pin 69. The threaded pin 69 passes through a bore 74 in the left stile 28 and engages the nut 73. The nut 73 compresses the spring 71 beneath a washer (not shown) to increase the friction between the special end cap 70' and the stile 28. The friction prevents the vanes from pivoting freely. Where there are two or more independent vane sets, as in FIG. 10A, each vane set is provided with a rotational friction means.

A hinge assembly 66 connects the louver door's inner frame 27 to the outer frame 12. FIGS. 5 and 5A show a cross-section of one such hinge assembly 66. Ordinarily, as shown in FIG. 10A, a pair of hinge assemblies 66 are used.

Each hinge assembly 66 preferably includes first and second portions, $66_1$, $66_2$, that pivotally engage one another. The first hinge portion $66_1$ is mounted to the outer frame 12, whereas the second hinged portion $66_2$ is mounted to the inner frame 27. The hinge portions $66_1$, $66_2$ are preferably separable so that the louver door 14 may be removed from the outer frame 12 for installation and cleaning.

A variety of mounting structures may be used to mount the hinge assembly 66 to the outer frame 12 and to the inner frame 27. Reinforcement may be desired to help the hinges bear the full weight of the louver door 14.

FIG. 5A shows a preferred hinge mounting structure that is employed with the wood frame insert 19 and the wood stile insert 250. Here, ordinary wood screws 245 are screwed into the wood inserts 19, 250 to secure the hinge assembly 66 to the vertical frame member 16 and the vertical stile 28.

FIG. 5 illustrates a first alternative hinge mounting structure that is employed in the absence of wood inserts 19, 250. Here, ordinary nuts and bolts are used to secure the hinge assembly 66 directly to the vertical frame member 16 and the vertical stile 28.

FIG. 10A shows a second alternative hinge mounting structure involving a hinge mounting block 167 that is positioned within the outer frame 12 to receive hinge mounting screws (not numbered). The hinge mounting block 167 may be provided with brass threaded apertures 169 for improved strength and durability. Alternatively, the hinge mounting screws may engage the frame insert 19 that extends along the length of the outer frame's frame members 16, 18, 20, 22.

Figure 10B:
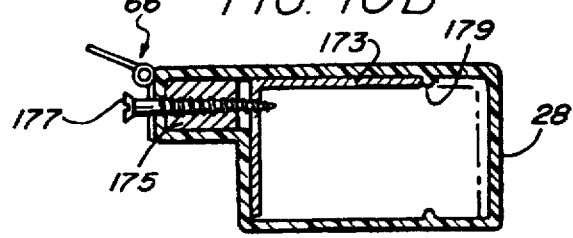
FIG. 10B is a cross-sectional view taken along line 10B—10B of FIG. 10A, showing a third alternative reinforcing and hinge mounting structure.

FIG. 10B is a cross-section of a third alternative hinge mounting structure that is comprised of an elongated L-shaped stiffener 173 and an elongated stile strip 175. The L-shaped stiffener 173 extends along the entire length of the stile 28 and contacts two of its inner sides. The stiffener 173 is preferably made of metal. The stile strip 175 fits within a projecting portion and extends along the entire length of the stile 28. The stile strip 175 is preferably made of polyvinyl chloride (PVC).

The hinge assembly 66 is mounted to the stile 28 with a pair of self-tapping screws 177 that are threaded through the strip 175. However, bores in the hinge assembly 66 and the stiffener plate 173 are preferably predrilled. The stile 28 and the stile strip 175 are thereby sandwiched between the hinge assembly 66 and the stiffener 173, thereby helping the stile 28 bear the weight of the louver door 14.

An interior rib 179 may be provided to help hold the L-shaped stiffening plate 173 within the interior of the stile 28. Alternatively, the stiffener plate 173 may be U-shaped plate (as shown by dotted lines) for even greater structural reinforcement.

FIG. 10C shows a fourth alternative reinforcing and hinge mounting structure that uses a modified U-shaped stiffener plate 173', which sandwiches the stile strip 175.

The reinforcing mechanisms shown in FIGS. 5A, 10B, and 10C are particularly desirable in embodiments where the louver door 14 has substantial weight, such as if it is particularly wide. Also, the reinforcing mechanism is desirable if a pair of articulated louver doors (not shown) are used rather than a single louver door 14. In such an embodiment, described above, two or more vertical louver doors are provided in a parallel arrangement, with a second louver door mounted to the right stile 30 of a first louver door hinged from its left stile 28. The additional weight of the second louver door acting upon the hinge assemblies 66 of the first may cause damage to the left stile 28 if the reinforcing mechanism is not employed. In such an embodiment, the reinforcing mechanism is also preferably included within the right stile 30, and in the stiles of the second door as well.

What has been described is a shutter door assembly 10 that is constructed primarily of extruded plastic components, yet appears and feels like an actual wooden shutter door assembly. The shutter door assembly is designed for easy assembly without requiring the use of any tools other than a common household drill and screwdriver. The shutter door may be easily constructed from its component parts within a fairly brief amount of time. The components are preferably shipped to jobbers, retailers, or customers in an unassembled form to minimize shipping and storage costs. The jobber, retailer, or customer then may quickly and easily assemble the shutter door for final sale or use. When assembled, the various components cooperate to provide a sturdy, durable shutter door assembly.

Components of various sizes may be shipped in a complete set such that a customer's order for a specific sized door may be filled by combining components of appropriate size. In this manner, custom orders are easily filled by a retailer without requiring a special order assembled at a factory.

The plastic components are extruded by a method which achieves a realistic look and feel such that the resulting components appear much like painted wood. The extrusion method and an apparatus for implementing the method will now be described with reference to the remaining figures.

FIG. 11 provides an exploded perspective view, somewhat in schematic form, of an extrusion system 200, for extruding hollow plastic tubes such as those used in the above-described shutter assembly. Extrusion system 200 includes an extrusion head 202 having a generally circular extrusion aperture 204, from which a circular tube of extrudant (not shown in FIG. 11) is extruded. Extrusion head 202 is of conventional design and manufacture and will not be described in further detail, other than to indicate that a cone 206 may be provided within extrusion aperture 204 for achieving a desired thinness of the extruded circular tube.

Mounted immediately adjacent to extrusion head 202 is a combination after-former/calibrator, collectively identified by reference numeral 205. A first portion of combination after-former/calibrator 205 is an after-former 208. After-former 208 includes a circular entry aperture 210 and a noncircular exit aperture 212. Entry aperture 210 has the same size and shape as extrusion aperture 204, and is positioned immediately adjacent to extrusion aperture 204 for directly receiving a tube of extrudant extruded from aperture 204. Exit aperture 212 is shaped to match the desired cross-section of a final tube. In FIG. 11, exit aperture 212 has a rectangular shape for producing a rectangular tube of extrudant. However, exit aperture 212 may have any arbitrary cross-sectional shape for forming any desired tube. Thus, exit aperture 212 may alternatively be square, L-shaped, etc.

The total circumference of the periphery of exit aperture 212 is approximately equal to the circumference of the periphery of entrance aperture 210.

A conversion conduit 214 connects entry aperture 210 and exit aperture 212. Conversion conduit 214 is a generally conical, hollow conduit which connects the periphery of the entry aperture to the periphery of the exit aperture. Thus, at entry aperture 210, conversion conduit 214 has a circular cross-section. At exit aperture 212, conversion conduit 214 has a rectangular cross-section. The conversion conduit is shaped to smoothly transform from a circular shape to a rectangular shape.

The extrudant enters conversion conduit 214 through entry aperture 210, and exits conversion conduit 214 through exit aperture 212. As the tube of extrudant passes along the interior of conversion conduit 214, the tube is gradually transformed from the initial circular cross-section to the final desired rectangular cross-section. To ensure that the extrudant adapts to the shape of the conversion conduit, a vacuum system 230 is provided. Vacuum system 230 operates to maintain the tube of extrudant against the interior walls of conversion conduit 214. Vacuum system 230 may be any of a variety of conventional vacuum systems, such as those used in conventional extrusion calibrators. In particular, the vacuum system may withdraw air from conversion conduit 214 through a plurality of small slots 218 formed along the entire interior surface of the conversion conduit. By maintaining a vacuum pressure through the slots, the extrudant is drawn outwardly and maintained against the interior walls of the connecting conduit.

Various other means for maintaining the extrudant against the interior of the connecting conduit may be used. For example, a means may be provided for pumping air into the hollow interior of the extrudant tube to press the extrudant outward against the walls of the conversion conduit. Generally, any of a variety of vacuum or pressure mechanisms employed within extrusion calibrators may be employed within the conversion conduit for maintaining the extrudant against the interior walls of the conduit.

A cooling system 228 is also provided which cools the extrudant as it passes through the conversion conduit. Preferably, water is sprayed against the extrudant through the slots. The water may include an antistatic detergent for preventing dust from clinging to the extrudant. The water/detergent coolant also helps to lubricate the extrudant. The cooling system may comprise, for example, a manifold of tubes (not shown) surrounding conduit 226 from which the cooling liquid is pumped.

Thus, as the extrudant is extruded from extrusion head 202, it passes into and through conversion conduit 214, where its cross-sectional profile is gradually transformed from circular to rectangular. Vacuum system 230 ensures that the extrudant does not collapse inwardly. By the time the extrudant exits the after-former portion of combined after-former/calibrator 205, the cross-section of the extrudant has been transformed to a rectangular cross-section. However, it has been found that the extrudant does not, and need not, precisely match the rectangular shape of exit aperture 212. Rather, the extrudant tube typically has slightly rounded corners corresponding to the sharp corners of the exit aperture. These rounded corners occur if the vacuum system does not fully draw the extrudant into the corners. Thus, a generally rectangular extrudant tube is achieved having rounded corners. As noted above, rounded corners are considerably stronger than sharp corners. Further, rounded corners achieve a smoother and more desirable aesthetic shape for the final tube. Thus, when used to form the shutter assembly described above, the curved corners of the extruded plastic tubes help to provide a realistic, wood-like appearance.

The roundness of the corners of the extrudant tube may be varied by at least one of two techniques. First, to reliably form tubes having rounded corners, the exit aperture 212 may be formed with rounded corners 215, rather than sharp corners. To provide tubes having sharper corners, an exit aperture having sharp corners is employed. The amount of vacuum pressure acting upon the extrudant in the vicinity of corners 215 also affects the sharpness of the resulting corner. Thus, if only a few vacuum slots 218 are provided along corners 215 of conversion conduit 214, then the extrudant will have somewhat rounded corners. However, if many vacuum slots 218 are provided along corners 215 of conduit 214 for maintaining a vacuum pressure along the corners, then the extrudant will be more completely drawn into the corners of the conduit, to thereby produce a final extruded tube having fairly sharp corners.

The initial circular cross-sectional shape of an exemplary extrudant is shown in FIG. 12A. The cross-section of FIG. 12A is that of an extrudant immediately prior to entry into entry aperture 210. In FIG. 12A, the extrudant is represented by reference numeral 220.

In FIG. 12B, the cross-sectional profile of the tube of extrudant is shown immediately after emerging from exit aperture 212. As can be seen from FIG. 12B, extrudant 220 has generally rounded corners 222.

Combination after-former/calibrator 205 also includes a calibrator portion 224 for further cooling of the rectangular tube of extrudant after it exits from the conversion conduit. Calibrator 224 includes a rectangular internal conduit 226 having the same rectangular shape and size as exit aperture 212 of after-former 208. The tube of extrudant enters conduit 226 and passes therethrough. Within conduit 226, the extrudant is cooled by a cooling system 228, described above.

Vacuum system 230 is also connected to calibrator portion 224 for maintaining the tube of extrudant against the interior walls of conduit 226 to prevent the tube of extrudant from collapsing inwardly while it is being cooled.

Ultimately, the tube of extrudant having the desired rectangular cross-section emerges from conduit 226 of calibrator 224 in a solid, cooled form.

Preferably, the after-former/calibrator comprise a single integral unit provided with a single vacuum system and a single cooling system. However, the calibrator and after-former may be separate devices, each provided with separate cooling systems and vacuum systems. As a single integral unit, after-former portion 208 does not have a true exit aperture 212. Rather, conversion conduit 214 is integrally formed with conduit 226 of calibrator portion 224.

Although shown and described as forming a tube of extrudant having a rectangular cross-section, it should be appreciated that any arbitrary shape may be formed by selecting the appropriate internal conduit shapes of after-former 208 and calibrator 224. For example, to form the tubes of the shutter assembly described above, a variety of different-sized L-shaped conduits are provided. Also, the conversion conduit may be configured to receive a noncircular extrudant and convert it to another noncircular shape or possibly to a circular shape. Although shown and described as having an after-former separate from the calibrator, these components may be integrally formed. In such an embodiment, a first part of a combined unit would operate to convert the tube of extrudant to the desired shape, whereas a second part of the combined unit would operate to cool the extrudant.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A shutter assembly comprising:

a frame;

a louver door having a plurality of parallel extruded hollow plastic vanes, said louver door being pivotally mounted to said frame; and a tilting rod connecting said vanes of said louver door, said tilting rod having a plurality of I-bar members and a plurality of T-hooks for engaging with slots formed along sides of said hollow vanes, said plurality of T-hooks formed on said plurality of I-bar members and the I-bar members stackably held within a slot formed along a rear surface of said tilting rod.

2. The shutter assembly of claim 1 wherein each I-bar member carries one T-hook.

3. A shutter assembly comprising:

an outer frame having two hollow extruded horizontal members, two hollow extruded vertical members, and means for connecting ends of the two hollow horizontal members to ends of the two hollow vertical members in a substantially rectangular configuration;

a plurality of horizontal member inserts comprised of wood, each horizontal member insert shaped to fit within and along a length of one of the two hollow horizontal members of said outer frame;

a plurality of vertical member inserts comprised of wood, each vertical member insert shaped to fit within and along a length of one of the two hollow vertical members of said outer frame, whereby said outer frame is provided with added rigidity and strength;

an inner frame having two hollow extruded horizontal rails, two hollow extruded vertical stiles, and means for connecting ends of the two hollow horizontal rails to ends of the two hollow vertical stiles in a substantially rectangular configuration that fits within the outer frame;

a plurality of rail inserts comprised of wood, each rail insert shaped to fit within and along a length of one of the two hollow rails of said inner frame;

a plurality of stile inserts comprised of wood, each stile insert shaped to fit within and along a length of one of the two hollow stiles of said inner frame, whereby said inner frame is provided with added rigidity and strength;

hinge means for pivotally connecting the inner frame to the outer frame;

a plurality of parallel spaced hollow extruded vanes;

a plurality of end caps, one end cap located at each end of an associated one of the plurality of hollow extruded vanes; and means for pivotally supporting each pair of end caps and each associated vane between the two hollow vertical stiles.

4. The shutter assembly of claim 3 wherein the means for pivotally connecting comprises:

a first plurality of spaced apertures formed along an inner wall of each vertical stile;

a second Plurality of apertures formed along on edge of each stile insert in alignment with the first plurality of apertures; and a pivot pin extending outward on each end cap, each of said pivot pins rotatably engaging one of said first plurality and a corresponding one of said second plurality of apertures.

5. The shutter assembly of claim 4 further comprising:

means for tensioning at least one of the pivot pins of said end caps to inhibit free rotation thereof.

6. The shutter assembly of claim 3 wherein the means for pivotally connecting comprises:

a plurality of spaced apertures formed along an inner wall of each hollow vertical stile;

a corresponding plurality of respectively spaced apertures formed along a side of the stile inserts which is adjacent to the inner wall of the hollow vertical stile, the respective apertures aligned with one another when the stile inserts are inserted into the hollow vertical stiles; and a pivot pin extending outward on each end cap, each of said pivot pins simultaneously rotatably engaging one of said plurality of apertures on the hollow vertical stile and an aligned one of said plurality of apertures on the stile insert.

7. The shutter assembly of claim 6 further comprising:

means for tensioning at least one of the pivot pins of said end caps to inhibit free rotation thereof.

8. The shutter assembly of claim 7 wherein said tensioning means comprises:

an enlarged aperture formed in one of said stile inserts; and a tensioning insert having an exterior which fits tightly within the enlarged aperture and an expandable interior for frictionally receiving said at least one of the pivot pins of said end caps.

9. The shutter assembly of claim 8 wherein said tensioning insert comprises:

an injection molded polymeric component having a cylindrical exterior, an axial rib extending radially inward from an interior wall of the cylindrical exterior, and a pair of arcuate arms extending from said axial rib to form the expandable interior for frictionally receiving the pivot pin.

10. The shutter assembly of claim 7 wherein a pivot pin associated with at least one out of every twelve vanes is provided with a means for tensioning.

11. The shutter assembly of claim 3, further comprising:

a hollow extruded pivot rod; and means for connecting the pivot rod to a front edge of the vanes of the louver set, whereby a user may simultaneously open and close the hollow vanes.

12. The shutter assembly of claim 11 wherein said means for connecting the pivot rod to the front edge of the hollow vane comprises:

a notch formed transversely along a front edge of each one of the plurality of hollow vanes;

a plurality of pivot rod members which each have a T-connector that engages a corresponding notch; and means for connecting the pivot rod members to the pivot rod.

13. The shutter assembly of claim 12 wherein the means for connecting the pivot rod members to the pivot rod comprises:

a notch formed along a back side of the pivot rod; and a base of each pivot rod member having a I-beam profile that is slideably attached to a notch of the pivot rod with one side of the I-beam profile inside of the pivot rod and another side of the I-beam profile and the T-connector outside of the pivot rod.

14. The shutter assembly of claim 13 wherein the base of each pivot rod member has a length corresponding to a spacing between adjacent ones of the plurality of vanes and wherein the T-connector extends from a center of the base whereby adjacent T-connectors have the same spacing as adjacent vanes when the pivot rod members are inserted, end-to-end, in the pivot rod.

* * * * *